United States Patent Office 2,899,422
Patented Aug. 11, 1959

2,899,422

PURIFICATION OF CHLORTETRACYCLINE

Robert Winterbottom, Pearl River, and Harold Mendelsohn, Nanuet, N.Y., Siegfried Arthur Muller, Closter, N.J., and Jerry Robert Daniel McCormick, New City, N.Y., assignors to American Cyanamid Company, New York, N.Y., a corporation of Maine No Drawing. Application August 31, 1956
Serial No. 607,296

6 Claims. (Cl. 260—207)

This invention relates to the recovery of chlortetracycline from aqueous solutions containing the same and is a continuation-in-part of our application Serial No. 515,216, filed June 13, 1955, which is in turn a continuation-in-part of application Serial No. 236,268, filed July 11, 1951. This application is also a continuation-in-part of application Serial No. 435,598, filed June 9, 1954. All of the above applications are now abandoned.

More particularly, the invention relates to a process of obtaining chlortetracycline in a purified form from aqueous solutions in which it is associated with fermentation mash impurities. Chlortetracycline may be recovered directly from fermentation liquors by the process of the present invention, from filtered fermentation liquors or from aqueous solutions containing chlortetracycline which has been partially purified but which is still associated with fermentation mash impurities. The process of the present invention involves the formation of a salt of chlortetracycline with organic sulfates or sulfonates of the types to be more particularly described hereinafter in an aqueous solution at a pH of less than about 3, which salt is then dissolved in an organic solvent and thereafter recovered from the organic solution preferably in the form of an acid salt of chlortetracycline.

The organic sulfates and sulfonates which may be used are those having a hydrophobic moiety R and the ionizable group —$SO_2OH$. The sulfonates may be represented by the formula $RSO_2OH$, whereas the sulfates which may be considered esters of sulfuric acid are represented by the group $ROSO_2OH$. These two classes may be represented by the general formula $R-O_n-SO_2OH$ where $n$ is a whole number not less than 0 nor more than 1 and R is a hydrophobic organic radical. Inasmuch as the group $SO_2OH$ is hydrophilic, the compounds possess surface active properties.

The hydrophobic radical R is a non-polar inert organic radical having a molecular weight sufficiently high to impart water-insolubility characteristics to the chlortetracycline salt, yet is not so high as to make the sulfate or sulfonate completely water insoluble. The molecular weight of the sulfates or sulfonates should be not less than about 200 so that the chlortetracycline salt will be water insoluble nor more than about 600, preferably less than 425, so that the sulfate or sulfonate is at least slightly water soluble. The hydrophobic radical may also be defined as an organic radical which, if attached to hydrogen to form the molecule R—H, the resulting compound would have a solubility in water of less than about 2 per cent and preferably less than one-quarter of 1 percent.

The hydrophobic group R of these surface active agents may be alkyl, aralkyl, or aryl which radicals may also have unreactive, or inert, non-functional groups such as chloro, hydroxy, nitro, azo, alkoxy, acyl, acyloxy, amido, or the like as will be apparent from the compounds used in the specific examples which follow and those named hereinafter which may be used in practicing the process. The terms "inert," "non-functional," and "unreactive," as used in this connection, mean those substituent groups which will not react with the chlortetracycline molecule at a pH below 3. Also, the group R— is free from hydrophilic groups which destroy its hydrophobic character. These alkyl, aralkyl, and aryl hydrophobic radicals shown in the general formulae above are attached by a carbon atom thereof to either an oxygen atom in the group —$OSO_2OH$ to form a sulfuric acid half ester or to a sulphur atom in the group —$SO_2OH$ to form a sulfonic acid derivative.

The group —$SO_2OH$ which is common to these surface active agents is ionizable to yield an anionic radical which reacts with the chlortetracycline to form the desired water-insoluble antibiotic salt. As will be obvious, particularly in view of the fact that they are used as reactants at a pH below about 3 in aqueous solution and will be ionized, the compounds may be added as the free sulfuric acid half ester or sulfonic acid or as salts thereof. These surface active agents are ordinarily sold as alkali metal sulfonates or sulfates, and as such will usually be the material added to the solution containing the chlortetracycline. The reaction with the chlortetracycline involves the anionic groups $ROSO_2O^-$ or $RSO_2O^-$ at these low pH levels; but since these are normally the dissociation products of organic sulfuric acids and organic sulfuric acid esters in aqueous solution, the reaction will for convenience be referred to as being between chlortetracycline and an organic sulfuric or sulfonic acid.

Similarly, the chlortetracycline in the aqueous solution at a pH of less than 3 will function as a base whether added to the solution as an acid salt, free chlortetracycline, or as an alkali metal or alkaline earth metal salt thereof. Although chlortetracycline is amphoteric, the acidic nature of the solution in which the reaction is carried out causes the chlortetracycline to act as a base sufficiently strong to form a salt-type compound with the anionic organic sulfuric or sulfonic derivatives described above.

One group of surface active agents which are useful are the half esters of sulfuric acid and higher aliphatic alcohols such as cetyl sulfate, lauryl sulfate, myristyl sulfate and the like. Another group of useful compounds are those prepared by sulfating unsaturated aliphatic esters and alcohols. Although these are often referred to as sulfonates, they are also half esters of sulfuric acid and are sometimes called sulfates. Among these are included 2-ethylheptyl sulfate, decyl sulfate, dodecyl sulfate, tetradecyl sulfate, heptadecyl sulfate, and the like. More complex aliphatic sulfonates include such compounds as sodium oleyl isethionate, sold under the tradename Igepon A; and sodium N-methyl-N-oleyl taurate, sold under the name Igepon T. There may also be used various sulfonated fatty amides and sulfonated amides of amino alcohols such as the sulfonated butanol amide of mixed higher fatty acids. Also, there are a number of complex sulfonated condensation products such as those of ethanolamine and the higher fatty acids. One such material appears on the market as Sulframin R and another, sodium palmitoyl methyl taurate, sold under the name Igepon TN-74. It will be understood, of course, that these sulfonates or sulfates are usually made from mixed higher fatty acids or higher aliphatic alcohols and are not particularly pure single substances.

A group of very effective surface active agents which may be used in practicing the process of the present invention which are aliphatic in character are the sulfonated esters of maleic acid, a preferred one being di-(2-ethylhexyl)sulfosuccinic acid sold under the trade name Aerosol OT. Other diesters of sulfosuccinic acid having up to eighteen carbon atoms in each ester group may also be used in practicing the process of the present invention.

Another type of surface active agent that may be used in the process is represented by the sulfonate of alkyl benzimidazoles, one such preparation being sold under the name Ultrabon K.

Many sulfonated aromatic compounds having hydrophobic properties are also commercially available and may be used in practicing the process of the invention. For the most part these are sulfonated benzene and naphthalene compounds, often having alkyl substituents. Among these may be mentioned propylated naphthalene sulfonic acid, sold under the trade name Aerosol OS, as the sodium salt; also sodium tetrahydro naphthalene sulfonate, sold as Alkanol S; and monobutylphenyl phenol sodium sulfonate, sold as Areskap; and sodium dodecyl benzene sulfate sold as Naccanol FSNO and Ultrawet. As will be seen from the specific examples, many of these aromatic sulfonates may have nitro, hydroxy, chloro and other inert non-functional groups in the molecule.

A number of miscellaneous compounds not mentioned in the specific examples which may be used in the process include sulfonated castor oil, sulfonated esters of ricinoelic acid, sulfonated 7-ethyl-2-methyl undecanol, n-octadecyl disodium succinamate, mono-lauryl sodium sulfosuccinamate, sodium stearyl sulfopropionate, turkey red oil and various other sulfonated and sulfated products having the hydrophobic group R as defined hereinabove. Still others are shown in specific examples and others will suggest themselves to those skilled in the art.

Another group of surface active organic sulfonates which may be used in practicing the process have azo groups and are therefore colored and are frequently referred to as dyes. Among these may be mentioned the sodium salt of 4-hydroxy azo benzene-4'-sulfonic acid, as shown in one of the examples which follow. Other related azo compounds may also be used as 4-(3-sulfobenzeneazo)diphenylamine, sodium salt; p-(2-hydroxy-1-naphthylazo)-benzene sulfonic acid sodium salt; and various others. Because of the fact, however, that these substances are highly colored, they are not generally desirable sulfonic acids with which to work in purifying chlortetracycline.

In practicing the process of the present invention, an aqueous solution containing chlorotetracycline is obtained. This may be crude fermentation liquor, but preferably all insoluble material is removed by filtration or centrifugation. This aqueous solution is adjusted to a pH of about 3, or less, by any convenient means. To the solution is then added one of the organic sulfates or sulfonates referred to above, and the pH maintained below 3 by the addition of acid if necessary. The amount of surface active agent added should be at least one molecular equivalent based upon the chlortetracycline present in the aqueous solution. Preferably there should be slightly more than one mol of the group —$SO_2OH$ for each mol of chlortetracycline. Molar ratios between 1 to 3 of the sulfonic acid or sulfuric acid derivative to one of chlortetracycline are suitable. Under these conditions, a salt of the chlortetracycline and the surface active agent will form and may be recovered. A preferred method of recovering the chlortetracycline is to adjust the pH of the solution to within the range 4 to 8 and filter to recover the insoluble salt. More rapid settling of the precipitate is obtained in these higher pH ranges. The chlortetracycline is recovered from its salt by dissolving the latter in an organic solvent and precipitating the chlortetracycline therefrom as an acid salt, preferably as chlortetracycline hydrochloride by the addition of hydrochloric acid thereto.

If desired, the step of precipitating the chlortetracycline salt from aqueous solution and recovery thereof may be avoided by adding to the solution at a pH of less than about 3 a water-immiscible organic solvent. Under these conditions the salt of chlortetracycline and the surface active agent that is formed is dissolved in the organic solvent which may then be separated from the aqueous phase, with the aid of salting-out agents if desired, and the chlortetracycline recovered from the organic solvent by precipitation as an acid salt as before. The organic solvent may be present at the time the salt is formed or may be added later.

Among the water-immiscible solvents that may be used in this particular aspect of the process are the halogenated hydrocarbons such as ethylene dichloride, trichloroethane, trichloroethylene, propylenedichloride, chloroform, the water-immiscible mono-ethers of glycols such as 2-phenoxyethanol, organic esters such as dimethylphthalate, ethyl hydrogen phthalate, isopropyl acetate, butyl acetate, ethers and substituted ethers such as dichloroisopropyl ether, ketones such as methyl isobutyl ketone or other of the higher ketones which are substantially water-immiscible, or more soluble ketones which are rendered water-immiscible by the addition of a salt to the aqueous layer. Alcohols of four or more carbon atoms such as methyl isobutyl carbinol, hexanol, butanol, amyl alcohol, etc., are good solvents.

When the chlortetracycline sulfonic acid salt is separated from the aqueous phase as a solid, it may be dissolved in any of the above solvents and subsequently recovered therefrom in purified form free from most of the fermentation impurities. In addition to these solvents, a variety of water-miscible solvents may be used to dissolve the separated chlortethracycline salt. These include methyl alcohol, ethyl alcohol, 2-ethoxy ethanol, and various other water-miscible organic solvents which are known to be solvents for chlortetracycline.

The chlortetracycline sulfonic, or sulfuric, acid salt formed in the aqueous solution at a pH below 3 may be recovered from the organic solvent system in which it later becomes associated in accordance with the process described above in a variety of ways. If desired, the organic solvent containing the antibiotic salt may be simply evaporated and the product used as such for some purposes, i.e., animal feed supplement, or it may be shipped in commerce or stored and later transformed into a more desirable therapeutic form. Preferably the salt is converted into one of the simple acid salts such as chlortetracycline hydrochloride by simply adding hydrochloric acid to the organic solvent solution. We find that by adding a salt such as triethylamine hydrochloride or ammonium chloride, or other nitrogenous base hydrochloride, or calcium chloride, or sodium chloride, etc., to the solution, the triethylamine salt or corresponding salt of the sulfate or sulfonic acid is formed by metathesis and remains dissolved and the antibiotic separates out as the hydrochloride salt.

The antibiotic may also be recovered from solution by adding a base to raise the pH of the solution, in which instance the antibiotic comes out as the neutral antibiotic or salt with the base, depending on the quantity and the nature of the base added. The solubility decreases rapidly with an increase in pH above 3.

Other methods of separating the antibiotic salt-type compound and converting it to other salts will suggest themselves to those skilled in the art.

Although the process just described is very effective in recovering chlortetracycline from aqueous solutions containing chlortetracycline and fermentation mash impurities and results in a product having a sufficiently high purity for many important purposes, a still higher quality product can be obtained by a modification which will be described. This improvement involves the use of small amounts of certain types of chelating agents. Particularly, we find that by the addition to the aqueous solution prior to recovery of the chlortetracycline salt therefrom of a heavy metal chelating agent whose pK for calcium is at least 7, it is possible to recover a product free from certain impurities which would otherwise tend to co-precipitate with the chlortetracycline salt. When practicing the process without using these chelating agents, a dark organic pigment of unknown chemical composition which is probably a fermentation impurity has a tendency to become associated in some unknown manner with the chlortetracycline salt and is not readily separated therefrom. Very small quantities of this material alter the light yellow color of the pure antibiotic to a brownish shade. Although this color does not appreciably affect the value of the antibiotic as a drug, it makes the chlortetracycline less desirable from a pharmaceutical point of view.

A study of the ultraviolet absorption of the crude antibiotic indicates that these impurities absorb strongly at wavelengths of 460 millimicrons, a region in which the pure antibiotics show a very low absorption. The absorption at this wave length forms a convenient method of measuring the quantity of these colored impurities. For this purpose, the extinction value at a wavelength of 460 millimicrons of a 1 percent solution of the sample in water in a cell having a light path of 1 centimeter is used as a standard. The value may be defined as:

$$E^{1\ cm.}_{1\%,\ 460\ m\mu} = \log \frac{I_0}{I}$$

where $I_0$ = energy of incident light
$I$ = energy of emergent light

This extinction coefficient for purified chlortetracycline is 0.16. A value below 0.30 is usually acceptable for pharmaceutical use.

To be useful in removing impurities from, and the recovery of, chlortetracycline, the chelating agent should have a stronger affinity for the impurities than do these antibiotics. The affinity for calcium ions is a good index of the efficacy in the present recovery systems.

The affinity for metals may be expressed by an equilibrium constant. An equilibrium constant for the formation of a metal chelate by the inter-action of a metal with the chelating agent of the type:

$$M + nKe = MKe_n$$

is given by the equation:

$$K = \frac{(MKe_n)}{(M)(Ke)^n}$$

where:

( ) = represent activities
$MKe_n$ = metal chelate formed
$M$ = metal ion
$Ke$ = chelate anion
$n$ = the number of ligands attached to the metal The logarithm of this constant, which may be written as pKCa+2 for bi-valent calcium is a convenient method of indicating the strength of the various chelating agents. Aminopolycarboxylic acids which form stable water-soluble chelates are extremely useful; the pKCa+2 value is preferably at least about 7 to insure that the chelating agents are stronger than the chelating effect of the antibiotics and accordingly will take the impurities away from the antibiotics yielding the antibiotics in comparatively pure form. Among such aminopolycarboxylic acids which are presently presently commercially available are:

Ethylenediamine tetraacetic acid—

(HOOCCH$_2$)$_2$N—CH$_2$—CH$_2$—N(CH$_2$COOH)$_2$

Trimethylenediamine tetraacetic acid—

(HOOCCH$_2$)$_2$N—CH$_2$—CH$_2$—CH$_2$—N(CH$_2$COOH)$_2$

Nitrilotriacetic acid—

N(CH$_2$COOH)$_3$

N'—(2-hydroxyethyl)-ethylenediamine-N,N,N' - triacetic acid—

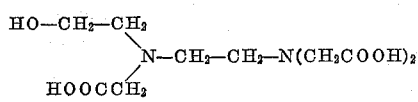

1,2-diamino-cyclohexane-N,N,N',N'-tetraacetic acid—

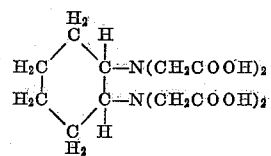

Dipropylene-1,2-triamine pentaacetic acid—

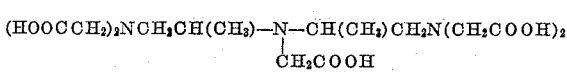

1,3-diamino-2-propanol tetraacetic acid—

(HOOCCH$_2$)$_2$NCH$_2$CH(OH)CH$_2$N(CH$_2$OOH)$_2$

2-[bis-(carboxymethyl)amino]ethyl ether—

(HOOCCH$_2$)$_2$N—CH$_2$CH$_2$OCH$_2$CH$_2$N(CH$_2$COOH)$_2$

Bis[2-(N,N-carboxymethyl)-aminoethoxy]ethane—

(HOOCCH$_2$)$_2$N—CH$_2$CH$_2$OCH$_2$CH$_2$OCH$_2$CH$_2$—N(CH$_2$COOH)$_2$ 2-aminoethyl phosphonic acid-N,N-diacetic acid—

H$_3$OP—CH$_2$CH$_2$—NH(CH$_2$COOH)$_2$

Aminobarbituric acid-N,N-diacetic acid (Uramil N,N-diacetic acid)—

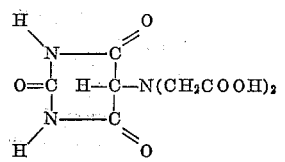

1,2-propylenediamine tetraacetic acid—

(HOOCCH$_2$)$_2$NCH(CH$_3$)CH$_2$N(CH$_2$COOH)$_2$

Diethylenetriamine pentaacetic acid—

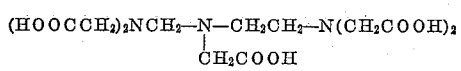

While not necessarily predicted thereon as the theory for the interactions involved, the results obtained by the addition of these chelating agents to the antibiotic-containing solutions is consistent with the theory that the chlortetracycline form complexes with polyvalent metals and impurities. The chlortetracycline is a chelating agent and thereby forms chelates with impurities. When a chelating agent with a stronger affinity for the impurities is present, the antibiotic is released from the impurities, and is more available in purer form. The use of chelating agents is thus of advantage in any process in which the antibiotic chlortetracycline is separated from an aqueous phase.

The preferred quantity of the sequestering agent will, of course, vary with the concentration of the impurities to be sequestered and the process used. Frequently, from 0.1 percent to 1 percent on a weight-per-volume-of-solution basis will sufficiently remove the interfering impurities that a pharmaceutically acceptable grade can be obtained from an initial mash filtrate; and the salt of the antibiotic may be converted to a pharmaceutically desirable form without the necessity for intermediate recrystallization or manipulation. A lesser quantity of the sequestering agent can give a sufficiently pure product so that a single recrystallization can both provide for final purification and for conversion to a desired form of the antibiotic and thus increase the final yields from the broth. A smaller quantity assists, but not as much, unless the quantity of impurities is small.

The invention will now be illustrated more particularly by means of a number of examples.

EXAMPLE 1

A solution was prepared containing 3.5 grams of crude neutral chlortetracycline assaying 800 gammas per milligram in 1500 cc. of water. To this solution was added 1.7 grams of the sodium salt of 2,4-dichlorophenol-6-sulfonic acid. The mixture was stirred and the pH adjusted to 2 by the addition of 25 percent sulfuric acid. After equilibrium was established, the solution was extracted with 375 cc. of methyl isobutyl ketone. The aqueous phase had added thereto an additional 1-gram portion of sodium 2,4-dichlorophenol-6-sulfonate and was again extracted with 150 cc. portions of methyl isobutyl ketone. Three such extractions were performed. The raffinate assayed 51 gammas per cc. indicating almost complete extraction. The separate solvent fractions were combined to form a pooled solvent phase of 774 cc. which assayed 3480 gammas per cc. The extract was concentrated under reduced pressure at a temperature not exceeding 40° C. to a volume of 31 cc. To the concentrate was added 0.6 cc. of concentrated hydrochloric acid resulting in the immediate precipitation of chlortetracycline hydrochloride in amorphous form. The precipitate was separated by filtration and slurried with 5 cc. of 2-ethoxyethanol ("Cellosolve"). The amorphous product then crystallized, yielding 2.15 grams of the purified chlortetracycline hydrochloride. The product assayed 994 gammas per milligram indicating an almost pure chlortetracycline hydrochloride and representing a 69 percent recovery of the original activity.

It may be noted that the chlortetracycline hydrochloride may come down as either the amorphous or the crystalline form depending upon the presence of seed crystals, etc. The same procedure may be used with either form.

EXAMPLE 2

Two liters of *Streptomyces aureofaciens* fermentation mash containing calcium ions and assaying 1100 gammas per cc. of antibiotic activity were adjusted to a pH of 8.5 by the addition of 25 percent sodium hydroxide solution. The mixture had added thereto 0.5 percent by weight of diatomaceous earth as the filter aid, and the solids were separated by filtration. The filter cake was suspended in 1 liter of water and acidified to a pH of 1.5 by the addition of 25 percent sulfuric acid. The mixture was warmed to 55° C. and stirred for 20 minutes, and the solids were filtered off. A second extraction of the filter cake was made with an additional 1 liter of water acidified to the same pH. The two extracts were combined and assayed 960 gammas per cc. 1.5 grams of 2,4-dichlorophenol-6-sulfonic acid as the sodium salt was added and the solution extracted with 500 cc. of methyl isobutyl ketone. The solvent phase was separated and the aqueous phase again treated with an additional 1.5 grams of sodium 2,4-dichlorophenol-6-sulfonate and extracted with 200 cc. of methyl isobutyl ketone, and then extracted successively with two additional 200 cc. portions of methyl isobutyl ketone. The pH remained below 3. The final raffinate assayed 29 gammas per cc. indicating substantially complete extraction. The solvent extracts were pooled and concentrated under reduced pressure at a temperature not exceeding 55° C. to 27 cc. To the concentrate was added 0.5 cc. of concentrated hydrochloric acid and the mixture chilled at 0° C. Amorphous chlortetracycline hydrochloride formed, which was filtered off and slurried with 4 cc. of 2-ethoxyethanol. The amorphous hydrochloride formed crystals in the 2-ethoxyethanol, yielding 1.27 grams of chlortetracycline hydrochloride assaying 860 gammas per milligram.

EXAMPLE 3

Three liters of chlortetracycline mash direct from the fermentation tanks, which assayed 1000 gammas per cc. were acidified to a pH of 2.0 with 25 percent sulfuric acid. The acidified mash was stirred for 30 minutes and filtered. To the clear filtrate was added 1 gram of sodium 2,4-dichlorophenol-6-sulfonate. The mixture was then extracted with 560 cc. of methyl isobutyl ketone. The aqueous layer was re-extracted after the addition of 0.8 gram of sodium 2,4-dichlorophenol-6-sulfonate with four successive 250 cc. portions of methyl isobutyl ketone. The pH remained below 3. The spent aqueous layer assayed 47 gammas per cc. indicating almost complete extraction. The solvent layers were pooled and treated with 0.7 gram of decolorizing charcoal, the commercial product Darco G-60 being used. After the carbon was filtered off, the clear solution was concentrated at reduced pressure at a temperature not exceeding 50° C. to a volume of 22 cc. To the concentrate was then added 0.35 cc. of concentrated hydrochloric acid. The precipitate of amorphous chlortetracycline hydrochloride was filtered off and slurried in 5 cc. of 2-ethoxyethanol which caused the chlortetracycline to crystallize as the chlortetracycline hydrochloride. There was obtained 0.72 gram of light yellow chlortetracycline hydrochloride assaying 960 gammas per milligram.

Acids other than hydrochloric can be used for this step, but the medical profession prefers this salt, and accordingly, their wishes are deferred to.

EXAMPLE 4

Chlortetracycline 4-hydroxyazobenzene-4'-sulfonate

A solution was prepared of 3 grams of the sodium salt of 4-hydroxyazobenzene-4'-sulfonic acid in 300 milliliters of water at 60° C. Thereto was added, dry, 5 grams of an impure chlortetracycline hydrochloride. Sufficient hydrochloric acid was added to lower the pH to 2.0. The mixture was stirred at 60° C. for 45 minutes during which time a precipitate of crystalline chlortetracycline 4-hydroxyazobenzene-4'-sulfonate was formed. The mixture was cooled, filtered, the crystals washed with cold water and dried. A yield of 6.77 grams were obtained in the form of orange rosettes which crystals assayed 710 gammas per milligram by a microbiological assay. The crystals had an uncorrected melting point of 235° C. with decomposition. The mother liquor assayed 150 gammas per milliliter. Based on an empirical formula of $C_{22}H_{23}N_2ClO_8 \cdot HCl$, for chlortetracycline hydrochloride, the empirical formula of the product obtained is $C_{34}H_{31}N_4O_{12}SCl$. This gives a calculated analysis of:

|  | Calculated | Found |
|---|---|---|
| Carbon | 54.1 | 52.4 |
| Hydrogen | 4.1 | 5.1 |
| Nitrogen | 7.4 | 7.2 |
| Sulfur | 4.2 | 4.1 |
| Chlorine | 4.7 | 4.5 |

The low chlorine analysis may in part be due to the presence of small amounts of tetracycline hydrochloride.

EXAMPLE 5

Chlortetracycline 2,4-dichlorophenol-6-sulfonate

A solution was prepared by dissolving 5 grams of chlortetracycline as the free material in 100 cc. of water acidified with 3 milliliters of 25 percent sulfuric acid. To this was added a previously prepared solution of 2.92 grams of sodium 2,4-dichlorophenol-6-sulfonate in 50 milliliters of water dropwise and with stirring, the experiment being conducted at room temperature. The pH remained below 3. A precipitate was formed of chlortetracycline 2,4-dichlorophenol-6-sulfonate. This precipitate was separated by filtration, washed with water, and dried, yielding 6.73 grams of a yellow crystalline product assaying 730 gammas per milligram. The crystals melted at 159–161° C. with decomposition (uncorrected). Based on an empirical formula of $C_{22}H_{23}N_2ClO_8 \cdot HCl$, for chlortetracycline hydrochloride, the empirical formula of the product obtained is $C_{28}H_{25}N_2O_{12}SCl_3$. This gives a calculated analysis of:

|         | Calculated | Found |
|---------|-----------|-------|
| Carbon  | 46.7      | 46.6  |
| Hydrogen| 3.5       | 3.9   |
| Nitrogen| 3.9       | 4.1   |
| Sulfur  | 4.4       | 4.6   |
| Chlorine| 14.8      | 13.8  |

EXAMPLE 6

*Chlortetracycline 2,4-dinitronaphthol-7-sulfonate*

Five grams of neutral chlortetracycline was dissolved in 100 milliliters of water, acidified by two milliliters of 25 percent sulfuric acid. The solution was warmed to 40° C. and treated in a dropwise manner at this temperature with a previously prepared solution containing 3.3 grams of 2,4-dinitronaphthol-7-sulfonic acid with stirring. The pH remained below 3. A yellow crystalline sulfonate salt precipitated. The reaction mixture was chilled to 4° C., the precipitate separated by filtration, washed with cold water, and dried in vacuo. There was obtained a yield of 7.25 grams of chlortetracycline 2,4-dinitronaphthol-7-sulfonate assaying 754 gammas per milligram. The crystals melted at 206–210° C. with decomposition (uncorrected).

EXAMPLE 7

*Chlortetracycline 2-chlorotoluene-5-sulfonate*

A solution was prepared containing 5 grams of free chlortetracycline in 100 milliliters of water acidified with 2 milliliters of 25 percent sulfuric acid. To this was added with stirring in a dropwise manner a solution of 2.35 grams of sodium 2-chlorotoluene-5-sulfonate in 85 milliliters of warm water with stirring, thereby forming a fine crystalline precipitate. The mixture was cooled to 4° C. and permitted to stand overnight and the resulting chlortetracycline 2-chlorotoluene-5-sulfonate was filtered off, washed with water and dried in vacuo. A yield of 5.82 grams assaying 812 gammas per milligram was obtained.

EXAMPLE 8

*Chlortetracycline 2,5-dichlorobenzene sulfonate*

The above procedure was repeated, using 2.59 grams of sodium 2,5-dichlorobenzene sulfonate which yielded 5.45 grams of chlortetracycline 2,5-dichlorobenzene sulfonate which analyzed 830 gammas per milligram of chlortetracycline.

EXAMPLE 9

*Chlortetracycline 4-nitrochlorobenzene-2-sulfonate*

Five grams of neutral chlortetracycline were treated with 130 milliliters of dilute sulfuric acid to give a solution having a pH of 1.5. To this solution was added dropwise with stirring a hot solution of 3 grams of sodium 4-nitrochlorobenzene-2-sulfonate in 120 milliliters of water. A light brown precipitate formed which, after chilling and standing, was separated by filtration, yielding 5.26 grams of chlortetracycline 4-nitrochlorobenzene-2-sulfonate which assayed 740 gammas per milligram. The material had an uncorrected melting point of 169–173° C.

EXAMPLE 10

A 2.0 liter sample of acid water extract, obtained by extracting alkaline cake, was treated with 7.5 grams of sodium lauryl sulfate. The solution was extracted with 500 milliliters of n-propyl acetate divided into two portions. The original aqueous solution assayed 1250 gammas per milliliter; the raffinate assayed 240 gammas per milliliter. The solvent extract was vacuum concentrated at a temperature below 35° C. to 10 percent of its original volume. During the concentration a precipitate of the chlortetracycline salt of lauryl sulfate was formed. The concentrate was filtered and the amorphous salt dissolved in 10 cc. of ethyl alcohol. The solution was filtered and acidified with 1.0 milliliter of 6 N hydrochloric acid. Chlortetracycline hydrochloride crystallized from solution and was filtered off after standing at room temperature for 12 hours. A yield of 1.25 grams of crystalline chlortetracycline hydrochloride assaying 940 gammas per milligram was obtained.

EXAMPLE 11

A 2.5 liter sample of acid water extract assaying 1500 gammas per milliliter was treated with 20 cc. of a 25 percent solution of sodium 2,9-diethyltridecane-6-sulfate (Tergitol 7). The solution was extracted with 600 milliliters of methyl isobutyl ketone, divided in three portions. The raffinate assayed 30 gammas per milliliter indicating almost complete extraction. The solvent extract was vacuum concentrated to 10 percent of its original volume at a temperature not exceeding 35° C. The concentrate was a slurry of chlortetracycline 2,9-diethyltridecane-6-sulfate. To this slurry was added 2.0 milliliters of 6 N hydrochloric acid. After stirring for five hours, the resultant amorphous chlortetracycline hydrochloride was filtered off. The amorphous salt when slurried with 6.0 milliliters of 2-ethoxyethanol dissolved. On continued stirring, chlortetracyclinehydrochloride crystallized from the solution. It was filtered off, washed with 2-ethoxyethanol and alcohol and dried. A yield of 2.6 grams chlortetracycline having a potency of 920 gammas per milligram was obtained.

EXAMPLE 12

Sixteen liters of an acidified aqueous solution of chlortetracycline assaying 1560 gammas per cc., at a pH of 1.0 had added thereto at room temperature 400 milliliters of ethylene dichloride. The mixture was stirred for about 2 minutes after which there was added thereto 100 milliliters of 70 percent Aerosol OT, the commercial aqueous solution being used. After stirring for 35 minutes, the solvent layer was separated on a centrifuge. The residual aqueous layer analyzed 60 gammas per milliliter. To 40 milliliters of the extract was added 40 milliliters of 2-ethoxyethanol, 2 milliliters of water and 4 grams of triethylamine hydrochloride. The mixture was stirred and sufficient concentrated hydrochloric acid added to lower the pH to 0.75. The mixture was agitated for 6 hours and permitted to stand for 10 hours at room temperature. The crystals formed were filtered out and washed with 2-ethoxyethanol, water, and three washes of alcohol. 3.92 grams of chlortetracycline hydrochloride were recovered which assayed 980 gammas per milligram.

EXAMPLE 13

Three liters of acid water extract, having a potency of 810 gammas per cc. was adjusted to pH 2.4 with dilute alkali and extracted with 600 cc. of n-propyl acetate after the addition of 28.0 cc. of a 25 percent aqueous solution of the sodium salt of tetradecyl sulfate. The extraction was repeated with an additional 600 cc. of n-propyl acetate. The combined n-propyl acetate extracts, having a volume of 1100 cc. were filtered and the pH raised to 4.75 by adding 1.5 cc. of triethylamine. After being concentrated in vacuo to 101 cc. and diluted with 20 cc. of alcohol and 15 cc. of 2-ethoxyethanol, the pH was adjusted to 5.2 with 0.4 cc. of triethylamine. The solution was immediately adjusted to pH 1.0 by adding 1.5 cc. of concentrated hydrochloric acid. The solution was stirred for three hours and then let stand for about sixteen hours at room temperature. The crystals which formed were filtered, washed successively with 2-ethoxyethanol, water, alcohol and dried. A yield of 1.61 grams of chlortetracycline hydrochloride assaying 868 gammas per milligram was obtained.

EXAMPLE 14

Two and a half liters of acid water extract at pH 1.5 assaying 975 gammas per cc. was extracted successively at pH 1.5 with 20 percent, 15 percent, and 10 percent by volume of n-butanol after adding three equivalents of the sodium salt of tetradecyl sulfate (Tergitol 4). The combined extracts (1032 cc.) were filtered and concentrated to about 5 percent of their original combined value. The concentrate containing chlortetracycline tetradecyl sulfate was treated with 2 cc. of concentrated hydrochloric acid to adjust the pH to 0.8. The reaction mixture was stirred for three hours, and allowed to stand sixteen hours at room temperature. The crude chlortetracycline hydrochloride was filtered, washed with 4 cc. of n-butanol and dried. A yield of 3.40 grams of chlortetracycline hydrochloride was obtained, which assayed 730 gammas per milligram.

EXAMPLE 15

Seventeen liters of acid water extract at pH 1.35 and assaying 775 gammas per cc. was treated with 60 grams of a 50 percent aqueous paste of Tergitol 4 and extracted with 1700 cc. of ethylene dichloride. The extraction was repeated using an additional 1700 cc. of ethylene dichloride and 30 grams of the 50 percent paste of Tergitol 4. The combined extract (3200 cc.) was filtered and concentrated in vacuo at 20–25° C. until substantially all of the ethylene dichloride was distilled off. Additional acid was not necessary. Eighty-five cc. of 2-ethoxyethanol was added to the concentrate. After filtering, the filtrate was divided into two equal 72 cc. portions. To the first, 2.2 cc. of water and 2.5 grams of triethylamine hydrochloride was added. The mixture was stirred and the pH was adjusted to 1.24 with 0.8 cc. of concentrated hydrochloric acid. After stirring three hours, chlortetracycline hydrochloride precipitated out. After standing sixteen hours at room temperature, the crude chlortetracycline hydrochloride was filtered, washed successively with 2-ethoxyethanol, water and alcohol and dried. A yield of 5.58 grams of light yellow chlortetracycline hydrochloride was obtained, assaying 1030 gammas per milligram.

EXAMPLE 16

Two and one half liters of acid water extract at pH 1.5 and assaying 975 gammas per cc. was extracted with 500 cc. of methyl isobutyl ketone after the addition of 28 cc. of a 25 percent aqueous solution of Tergitol 7. The aqueous layer was again extracted with 375 cc. of the ketone and subsequently with an additional 250 cc. The combined ketone extract was concentrated in vacuo to about 90 cc. The solids were filtered off. Two cc. of ethanolic 6 N hydrochloric acid were added to the filtrate to bring the pH to 0.75. The amorphous precipitate was filtered, and crystallized by suspension in 2.5 cc. of 2-ethoxyethanol. The crystals were filtered, washed with 2-ethoxyethanol and dried. A yield of 1.41 grams of crude chlortetracycline hydrochloride was obtained assaying 900 gammas per milligram.

EXAMPLE 17

Six liters of a solution of chlortetracycline hydrochloride at a pH of 1.5 assaying 1130 gammas per cc. was extracted with 600 cc. of ethylene dichloride in the presence of 20 cc. of a 70 percent aqueous solution of the sodium salt of di-2-ethylhexyl sulfosuccinate (Aerosol OT). The aqueous layer was again extracted with 600 cc. of ethylene dichloride using an additional 10 cc. of 70 percent Aerosol OT. The combined ethylene dichloride extract was stirred with 5.9 grams of charcoal for 30 minutes. The extract was then filtered and concentrated in vacuo at 20–25° C. to about 110 cc.

After dilution with 42 cc. of 2-ethoxyethanol, the concentrate was again treated with 1 percent (weight/volume) of charcoal and filtered. To the filtrate, triethylamine was added until the pH was 5.6. The mixture was then adjusted with concentrated hydrochloric acid to pH 1.72. Crystals begin to settle out. After stirring for three hours at room temperature, the chlortetracycline hydrochloride was filtered, washed successively with 2-ethoxyethanol, water and alcohol and dried. A yield of 4.68 grams of chlortetracycline hydrochloride was obtained assaying 900 gammas per milligram.

EXAMPLE 18

A 100-liter sample of acid water extract assaying 1000 gammas per cc. was extracted with 2500 cc. of isopropyl acetate in two portions, after adding 30 cc. of 70 percent Aerosol OT. The solvent layers were combined. After concentration in vacuo to 50 cc. the concentrate was diluted with 50 cc. of 2-ethoxyethanol and filtered. To the filtrate was added 4.0 cc. of water and 4.0 grams of solid triethylammonium chloride. When acidified with concentrated hydrochloric acid to pH 1.28 and stirred overnight, 8.61 grams of light yellow chlortetracycline hydrochloride assaying 930 gammas per milligram was obtained.

In certain of the examples above enumerated, it was found that the solution was sufficiently acidic under the circumstances set forth so that more acid was not required to maintain a pH of less than 3. We prefer that the extraction occur between approximately pH 1 and pH 2, or that the precipitation occur also within about this range if the salt is separated.

EXAMPLE 19

*Ethylenediamine tetraacetic acid and di-2-ethylhexylsulfosuccinic acid*

A 2.7-liter portion of chlortetracycline mash was acidified to pH 1.5 by the addition of 25 percent sulfuric acid. The mixture was filtered; and the filter cake slurried in 1.4 liters of water, adjusted to pH 1.5 with sulfuric acid, and heated at 65° C. for 10 minutes. The slurry was filtered and the filtrate cooled to room temperature. The combined filtrates, measuring 4 liters, were treated with 8 grams of a commercial preparation containing 80 percent by weight of the tetrasodium salt of ethylenediamine tetraacetic acid (Versene). After stirring for 10 minutes, 18 milliliters of a 75 percent aqueous solution of sodium di-2-ethylhexylsulfosuccinate was added. The mixture was stirred for 10 minutes and then the pH was adjusted to 5.0 with dilute caustic. After stirring an additional 10 minutes, the light yellow precipitate of the chlortetracycline salt of di-2-ethylhexylsulfosuccinic acid was allowed to settle for 2 hours. Supernatant water was decanted; and the lower phase was centrifuged to remove the rest of the free water. The centrifuged solid was mixed with 20 milliliters of 2-ethoxyethanol and the pH adjusted to 1.9 with 25 percent aqueous sulfuric acid. After stirring for 15 minutes, 2 grams of sodium chloride was added and the mixture centrifuged. The less dense phase of brine measured 92 milliliters. The dense organic phase was diluted with 20 milliliters of 2-ethoxyethanol and filtered. The filtrate was treated with 2 grams of sodium chloride and 2 milliliters of 6 N hydrochloric acid. The mixture was stirred overnight and crystals of chlortetracycline hydrochloride filtered, washed with a small amount of 2-ethoxyethanol, then ethanol, and dried. The chlortetracycline hydrochloride obtained weighed 2.5 grams and had a potency of 972 micrograms per milligram. Tests indicated it to be suitable for direct use in therapy with no further purification.

EXAMPLE 20

*Control*

A control experiment conducted in the same manner as Example 19 except that the sodium salt of ethylenediamine tetraacetic acid was omitted, gave a dark brown precipitate of the chlortetracycline salt of di-2-ethylhexyl-sulfosuccinic acid and subsequent steps yielded 2.7 grams of brownish chlortetracycline hydrochloride assaying 810 micrograms per milligram.

EXAMPLE 21

*Ethylenediamine tetraacetic acid and p-dodecylbenzene-sulfonic acid*

Four liters of combined acidified filtrates prepared as in Example 19 was treated with 12 grams of the tetrasodium salt of ethylenediamine tetraacetic acid. The pH was adjusted to 3.5 with 35 milliliters of aqueous ammonia. After the addition of 6 grams of the sodium salt of p-dodecylbenzenesulfonic acid (Kreelon), the mixture was stirred for one half hour, the pH adjusted to 6.8 and the mixture stirred an additional 10 minutes. After allowing the chlortetracycline sulfonic acid salt to settle for two hours the supernatant liquid was decanted, solids centrifuged, and the separated solids dissolved in 35 milliliters of 2-ethoxyethanol. The solution was adjusted to pH 2.0 with dilute sulfuric acid and 5 grams of sodium chloride was added. After stirring for 15 minutes the mixture was centrifuged to give two liquid phases. The lower 2-ethoxyethanol phase containing the chlortetracycline was diluted with 15 milliliters of 2-ethoxyethanol and filtered to remove solids. The insolubles were washed with 20 milliliters of 2-ethoxyethanol and the wash combined with the filtrate. Addition of 1.5 grams of sodium chloride and 2 milliliters of 35 percent hydrochloric acid followed by agitation resulted in the crystallization of chlortetracycline hydrochloride. After filtering and washing with 2-ethoxyethanol and ethanol, the light yellow crystals thus obtained were dried. A yield of 5.62 grams assaying 992 micrograms per milligram was obtained.

EXAMPLE 22

*Ethylenediamine tetraacetic acid and tetradecylsulfate*

A 4.0-liter portion of an acidified mash filtrate prepared as in Example 19 was stirred and treated with 12 grams of a crude commercial preparation containing 80 percent of the tetrasodium salt of ethylenediamine tetra-acetic acid. The pH was adjusted to pH 3.5 with aqueous caustic. With stirring 24 grams of a 50 percent aqueous solution of sodium tetradecylsulfate was added. (This material is sold in the United States under the trademark Tergitol 4 and is a commercial grade of 2-methyl-7-ethylundecyl-4-sulfate.)

After stirring for 40 minutes, the agitation was stopped and the light yellow flocculent precipitate of chlortetracycline tetradecylsulfate allowed to settle, decanted, and the solids separated by centrifugation. The moist solids were dissolved in 38 milliliters of 2-ethoxyethanol and treated with 3.0 grams of sodium chloride. After agitation the pH was adjusted to pH 2 with 25 percent sulfuric acid. The addition of 2.5 milliliters of 12 N hydrochloric acid and continued stirring resulted in the crystallization of chlortetracycline hydrochloride. After stirring overnight, the product was separated from the mother liquor, washed with 2-ethoxyethanol and dried. A yield of 6.95 grams assaying 700 micrograms per milligram was obtained.

EXAMPLE 23

*Ethylenediamine tetraacetic acid and p-hydroxyazobenzene p'-sodium sulfonate*

A 4.0-liter portion of an acidified mash filtrate prepared as in Example 19 was stirred and treated with 12.5 grams of commercial 80 percent tetrasodium ethylenediamine tetraacetate. The pH was adjusted to 2.6 with aqueous caustic soda. After adding 6.5 grams of p-hydroxyazobenzene p'-sodium sulfonate, the reaction mixture was heated to 45° C. with stirring for one hour. After cooling to room temperature, the stirring was continued for two hours longer. The chlortetracycline salt of p-hydroxyazobenzene p'-sulfonate was filtered out and dried under vacuum for one half hour. The salt was then dissolved in 35 milliliters of 2-ethoxyethanol. The mixture was acidified to pH 0.5 with concentrated hydrochloric acid and aged for one hour at 45° C. The mixture was then cooled to room temperature and aged with stirring for 16–18 hours. The crude chlortetracycline hydrochloride was filtered, washed with small portions of 2-ethoxyethanol, water and ethanol and dried. A yield of 2.1 grams of product assaying 847 micrograms per milligram was obtained.

EXAMPLE 24

*Trinitrilotriacetic acid and di-(2-ethylhexyl) sulfosuccinic acid*

Caustic soda was added to a 3.5-liter portion of acidified mash filtrate to raise the pH to 3.0. To this solution was then added 7.0 grams of trinitrilotriacetic acid. The mixture was stirred for 15 minutes, then 13 grams of sodium di-(2-ethylhexyl) sulfosuccinate was added. The pH of the mixture was raised to 7.0 with caustic soda and stirring continued for 40 minutes. The chlortetracycline salt of di-(2-ethylhexyl) sulfosuccinic acid was allowed to settle for three hours, the solution decanted and the solids centrifuged. Twenty milliliters of 2-ethoxyethanol was added to the damp precipitate, and 25 percent aqueous sulfuric acid to a pH 2.0. Stirring was continued for 15 minutes, then 3 grams of sodium chloride were added and followed by another 15 minutes of stirring. The mixture was centrifuged, and the 2-ethoxyethanol layer separated, the layer filtered, the filter washed with 20 milliliters of 2-ethoxyethanol, and the filtrate and washes combined. Thereto was added 0.5 gram of sodium chloride and concentrated aqueous hydrochloric acid to a pH of 0.5. The reaction mixture was aged for 36 hours at room temperature with vigorous agitation. The chlortetracycline hydrochloride formed was separated, washed with 2-ethoxyethanol, water and anhydrous ethanol. After drying at 56° C. there was obtained 4.3 grams of chlortetracycline hydrochloride assaying 997 microgram per milligram with an extinction coefficient of 1.09. A comparable run made omitting the trinitrilotriacetic acid gave 3.90 grams of chlortetracycline hydrochloride analyzing 986 micrograms per milligram but with an extinction coefficient of 1.33.

EXAMPLE 25

*N-(2-hydroxyethyl)-ethylenediamine N,N',N'-triacetic acid and di-(2-ethylhexyl)sulfosuccinic acid*

Example 24 was repeated using as the chelating agent 10.5 grams of N-(2-hydroxyethyl) - ethylenediamine N,N',N'-triacetic acid. The remainder of the experiment was conducted as in Example 24 on the identical mash filtrate. There was obtained 4.35 grams of chlortetracycline hydrochloride analyzing 965 micrograms per milligram with an extinction coefficient of 0.487.

Improved results were obtained by using trinitrilotriacetic acid with a log K Ca+2 value of 6.4; but even better results are obtained with N-(2-hydroxyethyl)-ethylenediamine N,N',N'-triacetic acid, whose log K Ca+2 is approximately 10.

What we claim is:

1. A process of purifying chlortetracycline which comprises the steps of adding to an aqueous solution having a pH within the range of about 1 to 3 and containing chlortetracycline and fermentation impurities at least one molecular equivalent based upon the chlortetracycline in the aqueous solution of an organic surface active compound selected from the group consisting of $RSO_3H$ and $ROSO_2OH$ in which R is an inert hydrophobic organic radical free of groups reactive with chlortetracycline, the molecular weight of said compound being between about 200 and 600 whereby a salt of chlortetracycline and said surface active compound is formed and thereafter recovering said salt.

2. A process of purifying chlortetracycline which comprises the steps of adding to an aqueous solution having a pH within the range of about 1 to 3 and containing chlortetracycline and fermentation impurities at least one molecular equivalent based upon the chlortetracycline in the aqueous solution of an organic surface active compound selected from the group consisting of $RSO_3H$ and $ROSO_2OH$ in which R is an inert hydrophobic organic radical free of groups reactive with chlortetracycline, the molecular weight of said compound being between about 200 and 600 whereby a salt of chlortetracycline and said surface active compound is formed.

3. A process in accordance with claim 1 in which the surface active organic compound is 2,4-dichlorophenol-6-sulfonic acid.

4. A process in accordance with claim 1 in which the surface active organic compound is parahydroxyazobenzene-para'-sulfonic acid.

5. A process in accordance with claim 1 in which the surface active organic compound is tetradecyl sulfuric acid.

6. A process in accordance with claim 1 in which the surface active organic compound is 2,4-dinitronaphthol-7-sulfonic acid.

References Cited in the file of this patent

UNITED STATES PATENTS

| | | |
|---|---|---|
| 2,516,080 | Sobin et al. | July 18, 1950 |
| 2,649,480 | Regna et al. | Aug. 18, 1953 |
| 2,658,078 | Blase | Nov. 3, 1953 |

FOREIGN PATENTS

| | | |
|---|---|---|
| 512,734 | Belgium | July 31, 1952 |

OTHER REFERENCES

Van Dyck et al.: Antibiotics and Chemotherapy, vol. 2 (April 1952), pp. 184 to 198.

Ruigh et al.: J. Am. Chem. Soc., vol 73 (1951), pp. 4057 and 4058.